(12) United States Patent
Watanabe et al.

(10) Patent No.: US 11,985,008 B2
(45) Date of Patent: May 14, 2024

(54) MEDIA GATEWAY DEVICE, AND MEDIA PATH CONFIGURATION METHOD

(71) Applicant: Nippon Telegraph and Telephone Corporation, Tokyo (JP)

(72) Inventors: Kosuke Watanabe, Tokyo (JP); Shintaro Tanaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 460 days.

(21) Appl. No.: 17/265,584

(22) PCT Filed: Jul. 26, 2019

(86) PCT No.: PCT/JP2019/029476
§ 371 (c)(1),
(2) Date: Feb. 3, 2021

(87) PCT Pub. No.: WO2020/031755
PCT Pub. Date: Feb. 13, 2020

(65) Prior Publication Data
US 2021/0344523 A1    Nov. 4, 2021

(30) Foreign Application Priority Data
Aug. 9, 2018 (JP) .................. 2018-149873

(51) Int. Cl.
*H04L 12/66* (2006.01)
*H04B 3/46* (2015.01)
(Continued)

(52) U.S. Cl.
CPC ............ *H04L 12/66* (2013.01); *H04M 3/323* (2013.01); *H04B 3/46* (2013.01); *H04B 17/18* (2015.01); *H04L 41/0661* (2023.05)

(58) Field of Classification Search
CPC ........... H04B 3/46; H04B 17/18; H04L 12/66; H04L 41/0672; H04M 3/00; H04M 3/323; H04M 11/00
See application file for complete search history.

(56) References Cited

U.S. PATENT DOCUMENTS 8,848,545 B1 * 9/2014 Huntsman ............... H04M 3/12
                                                            709/224
9,924,030 B1 * 3/2018 Vincent .................... H04W 8/12
(Continued)

FOREIGN PATENT DOCUMENTS

JP    2014-175975    9/2014

OTHER PUBLICATIONS

[No Author Listed], "JT-H248.1 Media Gateway Control Protocol," The Telecommunication Technology Committee, Jun. 1, 2006, 435 pages (with English Translation).

*Primary Examiner* — Khaled M Kassim
*Assistant Examiner* — Kai Chang
(74) *Attorney, Agent, or Firm* — Fish & Richardson P.C.

(57) ABSTRACT

[Problem] To reduce a setting burden on a media path in a media gateway.
[Solution] A MG (1) includes a first interface for connecting to a first network among a plurality of communication networks, a second interface for connecting to a second network among a plurality of communication networks, and a test command issuing unit (13) configured to establish, when a mapping between the first interface and the second interface is set by first setting data for associating a media path ID in the first interface with a termination ID in the first interface and second setting data for associating a media path ID in the second interface with a termination ID in the second interface, a test call for a media path passing through the first interface and the second interface based on the mapping and test, by assigning a resource to the media path (Continued)

that is established, whether data transmission and reception are possible on the media path that is established.

2 Claims, 7 Drawing Sheets

(51) Int. Cl.
*H04B 17/18* (2015.01)
*H04L 41/0659* (2022.01)
*H04M 3/32* (2006.01)

(56) References Cited

U.S. PATENT DOCUMENTS

| | | | | |
|---|---|---|---|---|
| 2004/0120312 A1* | 6/2004 | Yeom | ............... | H04L 12/66 370/352 |
| 2005/0149787 A1* | 7/2005 | Choi | ............... | H04L 12/66 714/724 |
| 2006/0120295 A1* | 6/2006 | Scholtens | ............... | H04L 65/80 370/248 |
| 2006/0203801 A1* | 9/2006 | Li | ............... | H04L 45/00 370/352 |
| 2007/0147398 A1* | 6/2007 | Upp | ............... | H04L 65/1101 370/395.2 |
| 2008/0025294 A1* | 1/2008 | Elliott | ............... | H04L 65/1104 370/356 |
| 2008/0298378 A1* | 12/2008 | Shiba | ............... | H04L 12/66 370/401 |
| 2010/0110894 A1* | 5/2010 | Smith | ............... | H04L 43/50 370/241 |
| 2011/0268128 A1* | 11/2011 | Aberg | ............... | H04L 65/1026 370/401 |
| 2012/0078566 A1* | 3/2012 | Gintis | ............... | H04L 41/0866 702/119 |
| 2016/0149979 A1* | 5/2016 | Farkas | ............... | H04L 65/70 709/226 |

* cited by examiner

| MEDIA PATH ID | TERMINATION ID |
|---|---|
| 1 | 1 |
| 2 | 2 |
| : | : |
| 200 | 200 |
| : | : |
| 400 | 400 |

Fig. 6

| MEDIA PATH ID | CONTINUITY TEST RESULT |
|---|---|
| 1 | PASS |
| 2 | FAIL |
| : | : |
| 200 | PASS |
| : | : |
| 400 | UNTESTED |

Fig. 7

MEDIA GATEWAY DEVICE, AND MEDIA PATH CONFIGURATION METHOD

CROSS-REFERENCE TO RELATED APPLICATIONS

This application is a National Stage application under 35 U.S.C. § 371 of International Application No. PCT/JP2019/029476, having an International Filing Date of Jul. 26, 2019, which claims priority to Japanese Application Serial No. 2018-149873, filed on Aug. 9, 2018. The disclosure of the prior application is considered part of the disclosure of this application, and is incorporated in its entirety into this application.

TECHNICAL FIELD

The present disclosure relates to a media gateway device and a media path setting method.

BACKGROUND ART

A media path set to provide a Voice over IP (VoIP) service is first generated as a session using a Session Initiation Protocol (SIP) call control signal. For the generated session, media resources required for data transmission and reception are assigned using a band control signal of a Media Gateway Control Protocol (Megaco) described in Non Patent Literature 1. Thus, a plurality of protocol signals are used in a series of sequences, thereby increasing a management burden.

Therefore, Patent Literature 1 describes a packet extraction device that binds an SIP signal and a signaling transport (SIGTRAN) signal via a Megaco signal for ensuring a call path in order to extract a series of sequences between different protocols even when there is no information that can be identified as the same corresponding call between the SIP signal and the SIGTRAN signal.

CITATION LIST

Non Patent Literature

Non Patent Literature 1: The Telecommunication Technology Committee, "JT-H248.1 Media Gateway Control Protocol", [online], Jun. 1, 2006, [Retrieved on Jul. 9, 2018], Internet <URL: https://www.ttc.or.jp/jp/document_list/pdf/j/STD/JT-H248.1v2.pdf>

Patent Literature

Patent Literature 1: JP 2014-175975 A

SUMMARY OF THE INVENTION

Technical Problem

A media gateway (MG) is a device that relays data on a media path set between terminals on different communication networks. The media gateway is responsible for relaying between different types of networks, such as relaying a terminal accommodated in a Public Switched Telephone Network (PSTN) and a terminal accommodated in an IP network.

FIG. 8 is a configuration diagram of a media communication system. The media communication system includes a Media Gateway Controller (MGC) 91, a MG 92 controlled from the MGC 91, a phone 94*a* connected to the MG 92 via a PSTN 93*a*, and a phone 94*b* connected to the MG 92 via an IP network 93*b*.

Here, the following information is registered in setting data 91*c* of the MGC 91, for example.

An identification ID of an interface in a logical MG 92 for each Trunk Group Number (TGN) of a common channel network (how many logical MGs 92 are registered for each TGN).

The number of lines by the TGN for each logical MG 92 (which circuit identification code (CIC) number is used for a certain TGN). The number of Chs required for each TGN is assigned.

Parameters for generating a termination ID for each logical MG 92.

The same termination ID as the termination ID generated by the MGC 91 using a logic of the MGC 91 is set in setting data 92*c* of the MG 92 for a media path 98 such as a VoIP channel.

Here, in order to set, as one Context, the media path 98 to be set between the phone 94*a* and the phone 94*b* via the MG 92, it is necessary for an interface on the PSTN 93*a* side through which the media path 98 passes and an interface on the IP network 93*b* side through which the same media path 98 passes to be appropriately mapped as the setting data 92*c* in the MG 92.

However, the termination ID, which is setting data for mapping the interface, may not be managed by the MGC 91, and is a parameter in which a setting error is likely to occur. Because the MGC 91 logically performs management of media resources, the MGC 91 does not explicitly perform management of each termination ID in the setting data 91*c* and may automatically generate the termination ID from another setting data parameter.

Meanwhile, the MG 92 needs to handle physical position information of the interface in the MG 92, and thus, the termination ID for each interface and the media resources are associated with each other and managed using the setting data 92*c*. Because the MGC 91 has no physical position information of the interface in the MG 92, processing of assigning the termination ID cannot be automated.

Therefore, in an actual operation, a maintenance person manually prepares a complex setting sheet as the setting data 92*c*. To prevent a setting error of the termination ID in this setting sheet, the maintenance person checks (collates) a consistency between content of the setting sheet and control content from the MGC 91 in advance.

Therefore, setting the termination ID requires a great deal of work. Because there are actually as many media paths 98 as a huge number of voice channels used by a telecom carrier, the work of setting media resources for these media paths 98 increases the number of operations of construction workers.

Thus, a main object of the present disclosure is to reduce a burden of setting of a media path in a media gateway.

Means for Solving the Problem

In order to solve the problem, a media gateway device of the present disclosure has the following characteristics.

The present disclosure is a media gateway device for relaying data on a media path set between terminals of a plurality of communication networks, the media gateway device including a first interface for connecting to a first network among the plurality of communication networks, a second interface for connecting to a second network among the plurality of communication networks, and a test command issuing unit configured to establish, when a mapping between the first interface and the second interface is set by first setting data for associating a media path ID in the first interface with a termination ID in the first interface and second setting data for associating a media path ID in the second interface with a termination ID in the second interface, a test call for a first media path passing through the first interface and the second interface based on the mapping and test, by assigning a resource to the first media path that is established, whether data transmission and reception are possible on the first media path that is established.

Thus, when the mapping between the first setting data and the second setting data is inappropriate, data cannot be transmitted and received on the media path and the mapping fails the test. Therefore, setting content of the termination ID and the media path ID in the media gateway is automatically tested, which makes it possible to reduce a burden of a maintenance person manually checking the setting content.

In the present disclosure, the test command issuing unit changes, when data transmission and reception are unsuccessful on the first media path that is established, the mapping between the first interface and the second interface to another untested combination, and then, again, establishes a test call for a second media path and tests, by assigning a resource to the second media path that is established, whether data transmission and reception are possible on the second media path that is established.

This allows the test command issuing unit to automatically set a mapping separate from a mapping that has failed in the test so that mappings that pass the test are sequentially tried in a round robin. Thus, even if a maintenance person does not manually input a correct mapping, a correct mapping is automatically set.

Effects of the Invention

According to the present disclosure, it is possible to reduce a burden of setting the media path in the media gateway.

BRIEF DESCRIPTION OF DRAWINGS

FIG. 6 is a table illustrating an example of setting data in a media protocol conversion unit according to the embodiment.

FIG. 7 is a table illustrating an example of setting data in a test command issuing unit according to the embodiment.

DESCRIPTION OF EMBODIMENTS

Hereinafter, an embodiment of the present disclosure will be described in detail with reference to the drawings.

Figure 1:
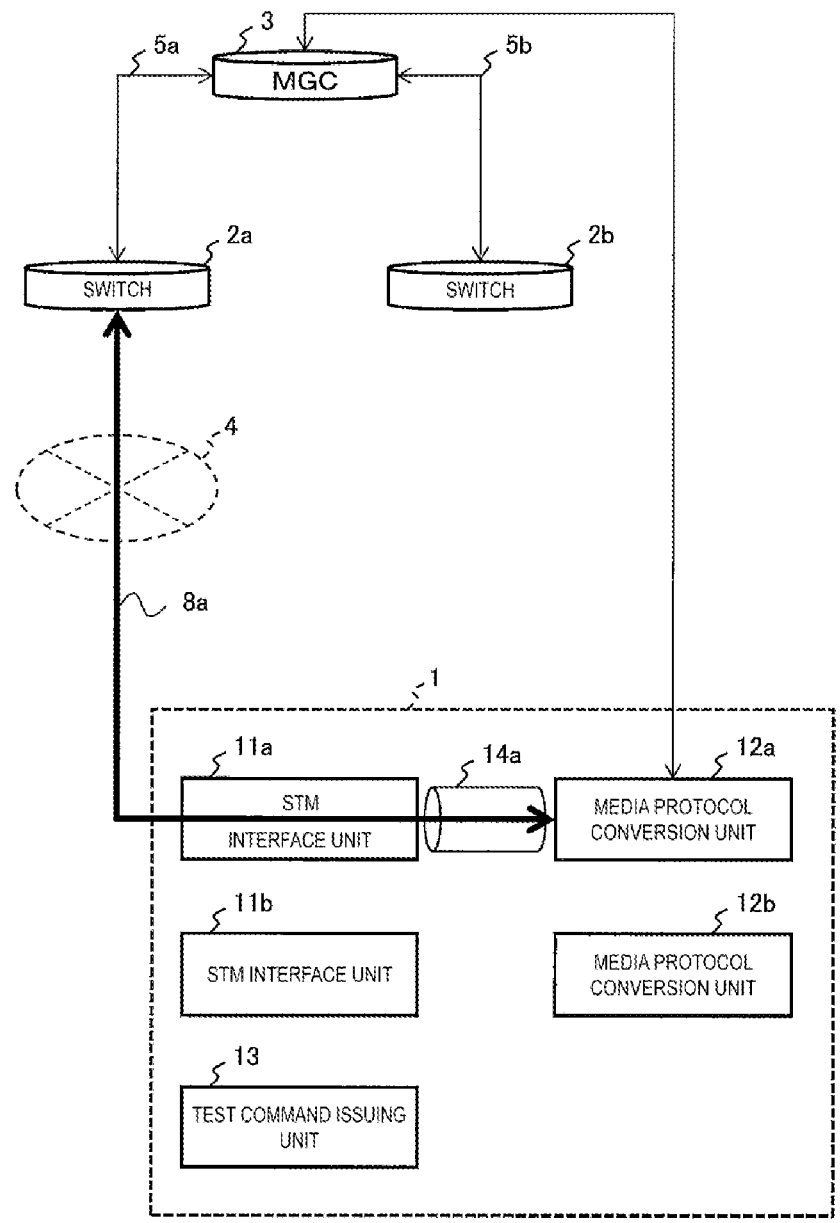
FIG. 1 is a configuration diagram illustrating a configuration of a media communication system according to the present embodiment.

FIG. 1 is a configuration diagram of a media communication system.

The media communication system includes an MGC 3, an MG 1 controlled from the MGC 3, a switch 2a connected to the MGC 3 via a common channel network 5a, and a switch 2b connected to the MGC 3 via a common channel network 5b. Further, the MG 1 is connected to the switch 2a via a PSTN 4.

The media gateway device (MG) 1 is configured as a transfer device exemplified by a router or the like. The transfer device exemplified by a router or the like includes a Central Processing Unit (CPU), a memory, a storage part (storage unit) exemplified by a hard disk, a non-volatile memory, or a solid state drive (SSD), and a network interface.

This computer operates a control unit (a control part) configured of each processing unit by the CPU executing a program (also referred to as an application, or an app that is an abbreviation thereof) read into the memory.

Figure 8:
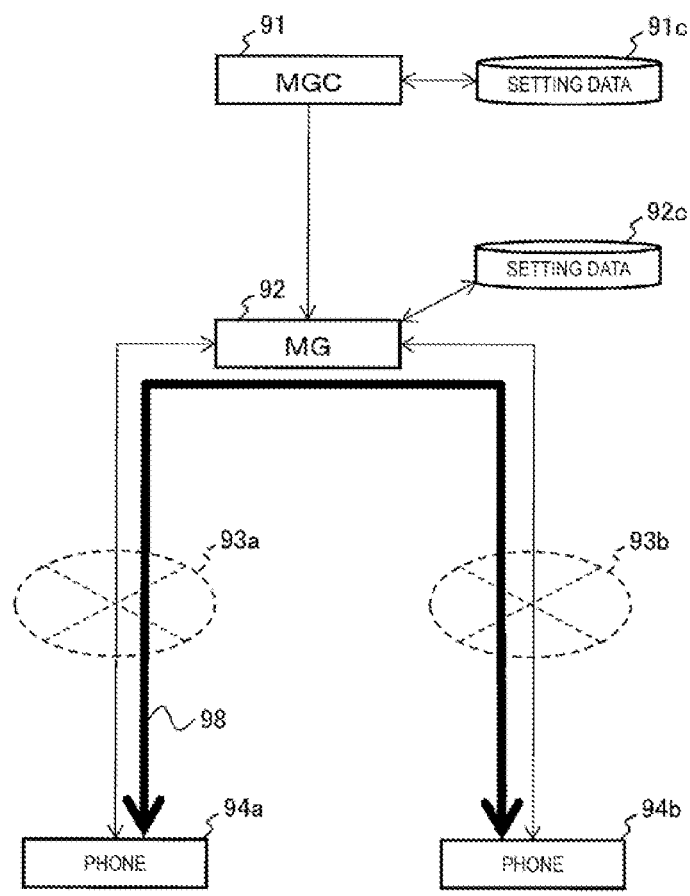
FIG. 8 is a configuration diagram of a media communication system.

The MG 1 includes a plurality of STM interface units 11a, 11b, . . . (hereinafter collectively referred to as an STM interface unit 11), a plurality of media protocol conversion units 12a, 12b, . . . (hereinafter collectively referred to as a media protocol conversion unit 12), and a test command issuing unit 13. The plurality of STM interface units 11 are first interfaces on the PSTN 4 side as a first network. The media protocol conversion unit 12 is a second interface on the IP network (an IP network 93b in FIG. 8) side as a second network (not illustrated).

A media path 8a passes through the switch 2a, the STM interface unit 11a in the MG 1, and the media protocol conversion unit 12a in the MG 1.

First setting data associates a media path ID and a termination ID both in the STM interface unit 11. Second setting data associates a media path ID and a termination ID both in the media protocol conversion unit 12 (see FIG. 6 for details).

As many termination IDs as the media resources (for example, media path IDs of 400 ch) that can be handled by each STM interface unit 11 are registered in the first setting data.

As many termination IDs as the media resources (for example, media path IDs of 400 ch) that can be handled by each media protocol conversion units 12 are registered in the second setting data.

An in-MG mapping 14a in FIG. 1 is setting content in which the media path ID (for example, 1) described in the first setting data of the STM interface unit 11a and the media path ID (for example, 1) described in the second setting data of the media protocol conversion unit 12a are combined. An in-MG mapping 14b in FIG. 2 is setting content in which the media path ID (for example, 1) described in the first setting data of the STM interface unit 11b and the media path ID (for example, 1) described in the second setting data of the media protocol conversion unit 12a are combined.

Figure 2:
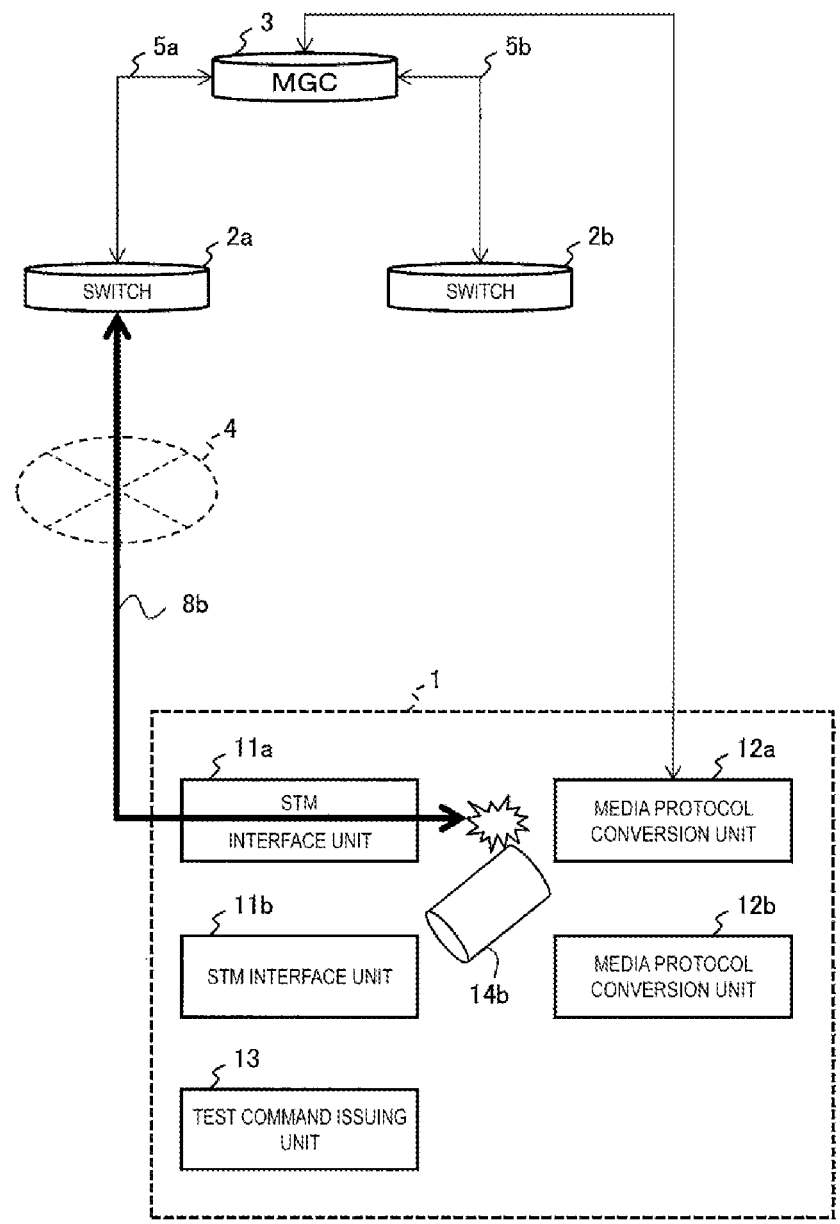
FIG. 2 is a configuration diagram of the media communication system in FIG. 1 according to the embodiment when a continuity test fails.

Hereinafter, the in-MG mapping 14a in FIG. 1 and the in-MG mapping 14b of FIG. 2 are collectively referred to as in-MG mapping 14. The in-MG mapping 14 is set in the MG 1 in conjunction with the setting data of the MGC 3.

Referring back to FIG. 1, the test command issuing unit 13 issues a test command to the switch 2a to control the continuity test of the media path 8a. In the continuity test of the media path 8a, the test command issuing unit 13 establishes a session between the switch 2a and the media protocol conversion unit 12a and assigns media resources to the session. When data exchange using the assigned media resources is successful between the switch 2a and the media protocol conversion unit 12a, the test command issuing unit 13 determines that the continuity test has passed.

That is, the in-MG mapping 14a transitions from a "provisional path setting" state prior to a test by the test command issuing unit 13 to an "after path setting" state after the test passes by the test command issuing unit 13.

FIG. 2 is a configuration diagram when a continuity test fails for the media communication system of FIG. 1. In FIG. 2, an in-MG mapping 14b that associates the STM interface unit 11b with the media protocol conversion unit 12a is set, unlike the in-MG mapping 14a in FIG. 1.

However, a media path 8b cannot establish a session between the switch 2a and the media protocol conversion unit 12a. This is because, although the media path 8b passes through the STM interface unit 11a, the in-MG mapping 14b does not associate the STM interface unit 11a. Thus, because data exchange is unsuccessful between the switch 2a and the media protocol conversion unit 12a, the test command issuing unit 13 determines that the continuity test has failed.

Hereinafter, details of the continuity test by the test command issuing unit 13 will be described with reference to FIGS. 3 to 5.

Figure 3:
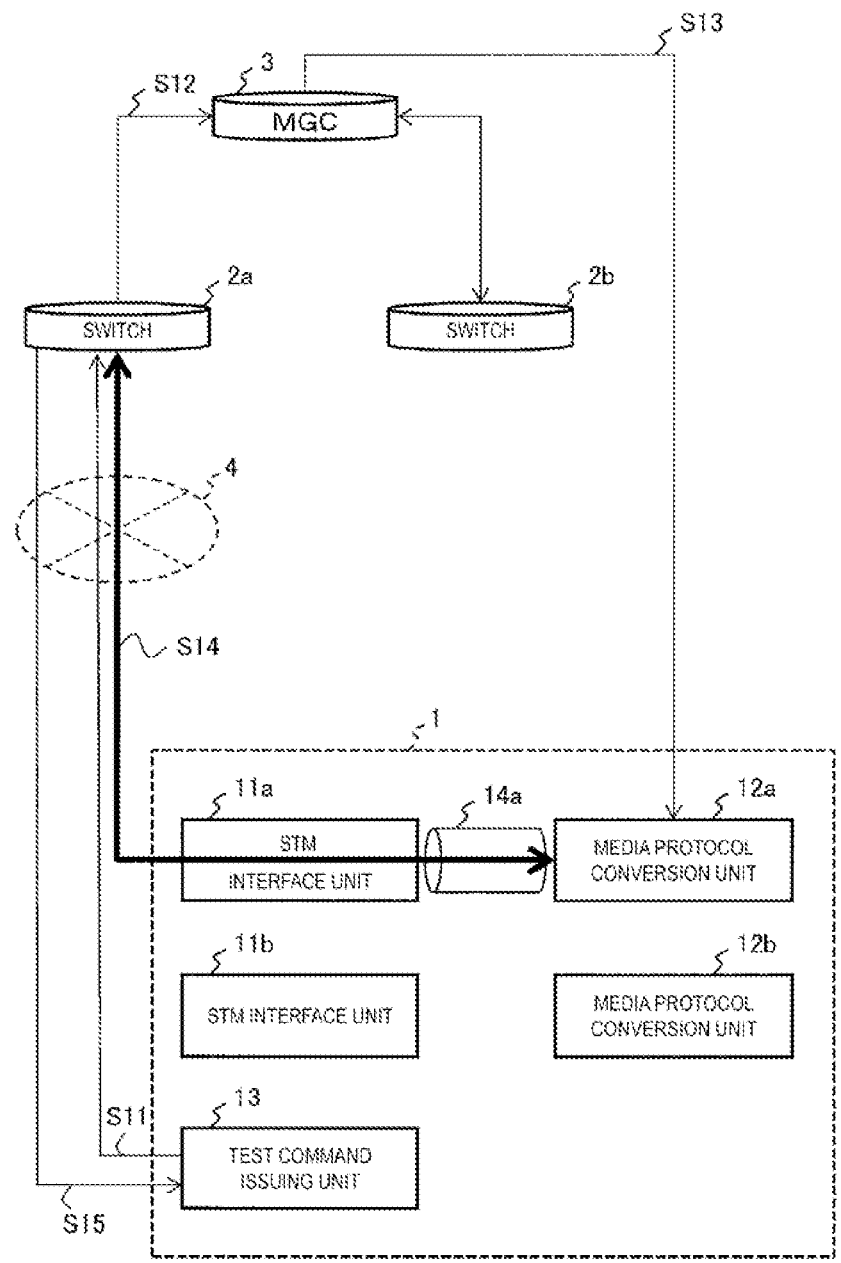
FIG. 3 is a configuration diagram illustrating each procedure when the continuity test passes according to the embodiment.

FIG. 3 is a configuration diagram illustrating each procedure when the continuity test passes. First, it is assumed that the in-MG mapping 14a is set in the MG 1 (a provisional path setting state) before S11 is executed.

In S11, the test command issuing unit 13 issues a test command to the switch 2a to perform a continuity test for a test call with the media path 8a in FIG. 1 as the test call. For example, a maintenance person inputs a test instruction to the MG 1 to activate processing of S11. The test command causes an outgoing call (session establishment) of the media path 8a, resource securing of the media path 8a (securing of a Megaco communication path), and data exchange of the media path 8a to be sequentially executed in this order.

Details of the test command are implemented, for example, as a sequence of an LooP Trunk (LPT) incoming test (loopback test) in JJ-90.10 Inter-Carrier Interface based on ISUP "http://www.ttc.or.jp/jp/document_list/pdf/j/STD/JJ-90.10v7.1.pdf" of a TTC standard.

In S12, the switch 2a receives the test command and requests the MGC 3 to call the media path 8a to the media protocol conversion unit 12a. This allows a session of the media path 8a to be established.

In S13, the MGC 3 receives the test command and secures media resources for the media path 8a established in S12. That is, the termination ID of the STM interface unit 11 and the termination ID of the media protocol conversion unit 12 are set as one Context in a Megaco signal, so that the media path 8a is established as a call path between the PSTN 4 and the IP network.

In S14, using the media path 8a in which the media resources are secured, the switch 2a transmits and receives a bit pattern for a test to and from the media protocol conversion unit 12a.

In S15, the switch 2a successfully transmits and receives the bit pattern using the media path 8a, and thus, replies to the test command issuing unit 13 with a test call result indicating that the continuity test has passed. This allows the media path 8a that has passed the continuity test to become available. Thereafter, when the media path 8a is used immediately, the media path 8a may be used as is, or when an opportunity for use of the media path 8a is in the future, the secured resources may be released and a test call for the media path 8a may be disconnected. The case in which the continuity test passes has been described with reference to FIG. 3.

Figure 4:
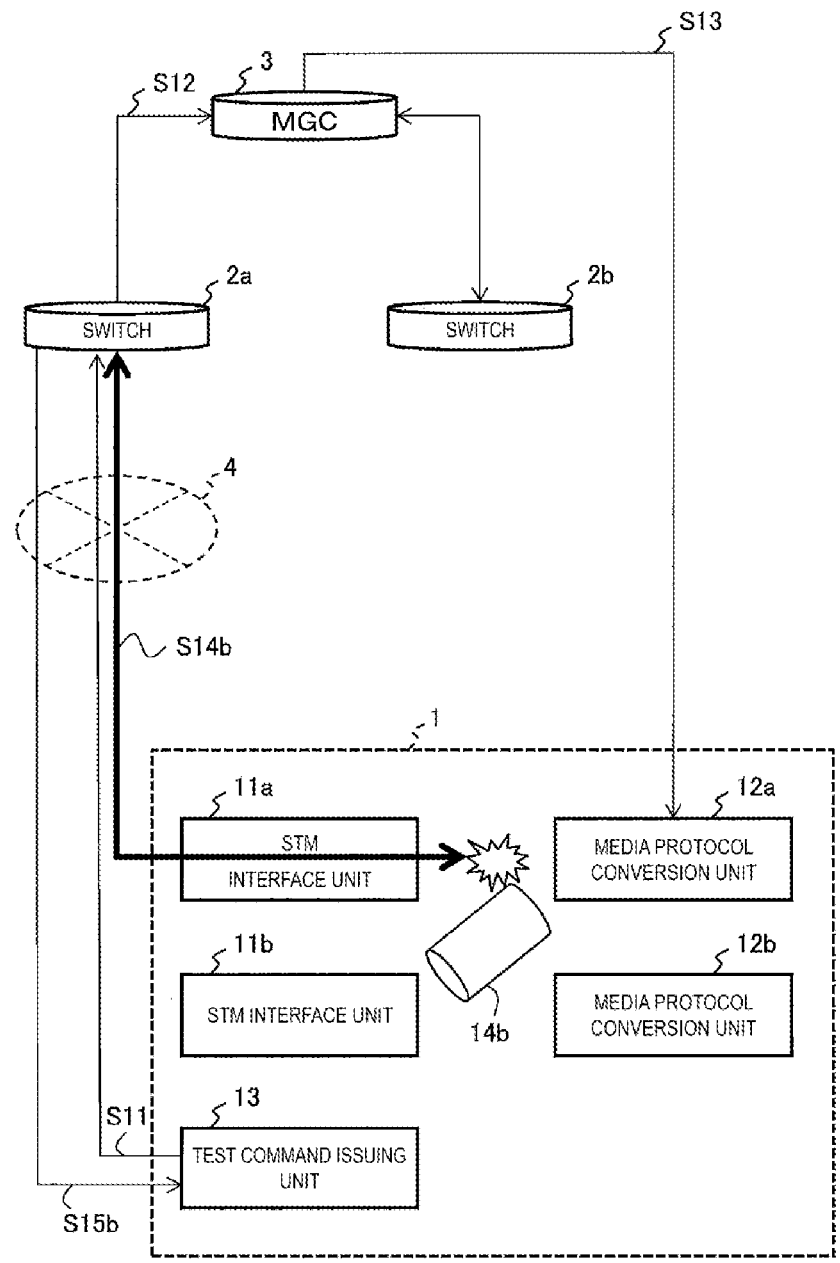
FIG. 4 is a configuration diagram illustrating each procedure when the continuity test fails according to the embodiment.

FIG. 4 is a configuration diagram showing each procedure when the continuity test fails. First, it is assumed that the in-MG mapping 14b is set in the MG 1 before S11 is executed (a provisional path setting state).

First, respective processing of S11 to S14 in FIG. 4 is obtained by replacing the test call from the media path 8a in FIG. 1 with the media path 8b in FIG. 2 for respective processing of S11 to S14 in FIG. 3. The media path 8b cannot establish a session between the switch 2a and the media protocol conversion unit 12a, as illustrated in FIG. 2. As S15b in FIG. 4 instead of S15 in FIG. 3, the switch 2a replies, in response to the unsuccess of the transmission and reception of the bit pattern due to incorrectly configured media path 8b, to the test command issuing unit 13 with a test call result indicating that the continuity test has failed.

Figure 5:
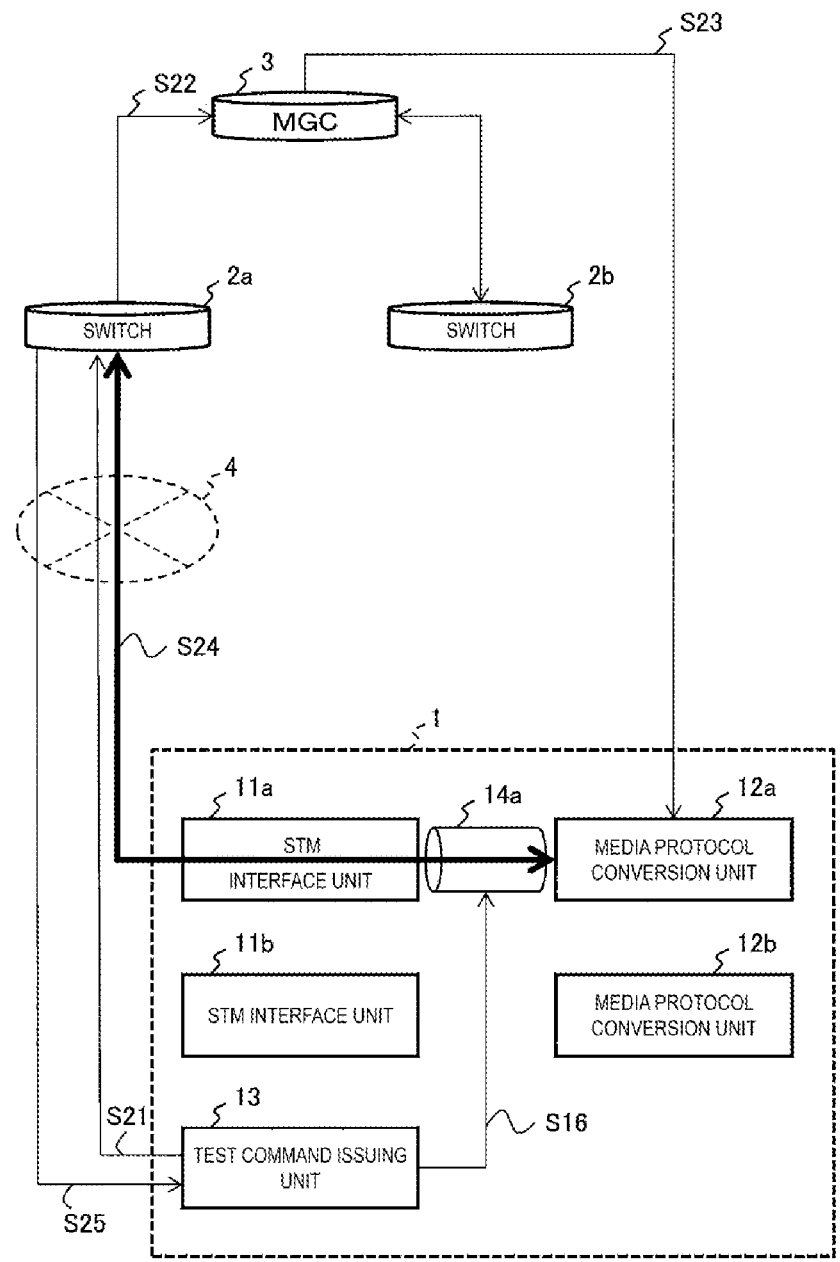
FIG. 5 is a configuration diagram illustrating each procedure until a re-continuity test passes as a continuation of FIG. 4 according to the embodiment.

FIG. 5 is a configuration diagram illustrating each procedure until a re-continuity test passes as a continuation of FIG. 4.

In S16, the test command issuing unit 13 issues a change command to replace the media path 8b for the test call with the media path 8a. The STM interface unit 11 receiving this change command changes the in-MG mapping 14b to the in-MG mapping 14a to replace the media path 8b with the media path 8a (the state after path setting).

An example of a determination of the in-MG mapping 14 to which the test command issuing unit 13 changes the in-MG mapping 14b may include a method of sequentially testing a combination of the untested in-MG mapping 14 (that is, a combination of the STM interface unit 11 and the media protocol conversion unit 12) in a round robin.

The respective processing (re-continuity test) of S21 to S25 in FIG. 5 are the same as the respective processing (initial continuity test) of S11 to S15 in FIG. 3. That is, the media path 8a after the replacement passes the continuity test.

FIG. 6 is a table illustrating an example of the setting data in the media protocol conversion unit 12a. The setting data in FIG. 6 is a combination of the media path ID (which is a channel number for internal management, such as "VoIP Ch No.") in the media protocol conversion unit 12a with the termination ID, as the second setting data.

The in-MG mapping 14a in which a combination of the first setting data of the STM interface unit 11a and the second setting data of the media protocol conversion unit 12a is correctly designated passes the continuity test as illustrated in FIG. 1.

The in-MG mapping 14b in which a combination of the first setting data of the STM interface unit 11b and the second setting data of the media protocol conversion unit 12a is correctly designated fails the continuity test as illustrated in FIG. 2.

FIG. 7 is a table illustrating an example of setting data in the test command issuing unit 13. This table associates a continuity test result with each media path ID. When the new in-MG mapping 14 is set in the MG 1, for example, the test command issuing unit 13 associates the media path ID regarding the new in-MG mapping 14 with the continuity test result "untested" and registers a result of the association in the table in FIG. 7.

The test command issuing unit 13 receives the continuity test result for the untested in-MG mapping 14, and changes the continuity test result from "untested" to "pass" or "fail". This allows the test command issuing unit 13 to appropriately set the in-MG mapping 14 in which the continuity test result is not "pass", as a test target.

The embodiment described above is mainly characterized in that the MG 1 includes the test command issuing unit 13 for avoiding a control error caused by a setting error of the in-MG mapping 14b through the continuity test.

The test command issuing unit 13 transmits a test command to the switch 2a to issue a test call, so that an LPT incoming test of the media path 8b is executed between the switch 2a and the MG 1. The test command issuing unit 13 changes the in-MG mapping 14b to the in-MG mapping 14a based on a result of the test to set the media path from the media path 8b to the media path 8a again. Thus, the test command issuing unit 13 changes the in-MG mapping 14 until the continuity test passes.

Thus, automatic setting of the media path 8a allows the control error caused by the setting error of the in-MG mapping 14b to be avoided and a number of work operations in pre-setting work and setting work to be reduced.

On the other hand, in the known art, the maintenance person has manually set the first setting data in the STM interface unit 11 and the second setting data in the media protocol conversion unit 12 as path setting work for associating the termination IDs of the same media path IDs with each other. A test for confirming the validity of each of the first setting data and the second setting data is also performed manually by the maintenance person as separate work. Therefore, the number of work operations that is a burden for the maintenance person is appropriately reduced through processing of concurrent execution of automated processing of the path setting and the continuity test by the test command issuing unit 13 of the embodiment.

Although the MG 1 according to the present disclosure issues the test command from the PSTN 4 to the switch 2a as illustrated in FIG. 1 in the embodiment, the test command may be issued from the IP network. Further, in the present disclosure, hardware resources of a general-purpose computer can be implemented by a program that operates as each of parts of the MG 1. This program may also be distributed via a communications line or may be recorded and distributed on a recording medium such as a CD-ROM.

REFERENCE SIGNS LIST

1 MG (media gateway device)
2a, 2b Switch
3 MGC
4 PSTN (first network)
5a, 5b Common channel network
8a, 8b Media path
11 STM interface unit (first interface)
12 Media protocol conversion unit (second interface)
13 Test command issuing unit
14a, 14b In-MG mapping

The invention claimed is:

1. A media gateway device for relaying data on a media path set between terminals of a plurality of communication networks, the media gateway device comprising:
a Synchronous Transport Module (STM) interface for connecting to a public switched telephone network (PSTN) among the plurality of communication networks;
a media protocol conversion interface for connecting to an IP network among the plurality of communication networks; and
a test command issuing unit, including one or more processors, configured to:
register first setting data comprising a plurality of data entries, each respective data entry associating a respective media path ID in the STM interface with a respective termination ID in the STM interface;
register second setting data comprising a plurality of data entries, each respective data entry associating a media path ID in the media protocol conversion interface with a respective termination ID in the media protocol conversion interface; and
for each respective combination in a plurality of combinations combining one respective data entry selected from the first setting data and one respective data entry selected from the second setting data, generate a respective mapping between the STM interface and the media protocol conversion interface by associating a first termination ID of the STM interface specified in the data entry selected from the first setting data with a second termination ID of the media protocol conversion interface specified in the data entry selected from the second setting data, and perform a respective test call for a respective media path corresponding to the respective mapping, wherein performing the respective test call comprises:
issuing a test command to establish a session for the respective media path;
assigning a resource to the session established for the respective media path by setting the first termination ID of the STM interface and the second termination ID of the media protocol conversion interface as one context in a Megaco signal;
transmitting a bit pattern to the media protocol conversion interface using the respective media path and the assigned resource;
receiving the bit pattern from the media protocol conversion interface using the respective media path;
in response to successfully transmitting the bit pattern to the media protocol conversion interface and receiving the bit pattern from the media protocol conversion interface, determining that the respective media path has passed a continuity test; and
storing a continuity test status of the respective media path in association with a respective media path ID.

2. A media path setting method executed by a media gateway device for relaying data on a media path set between terminals of a plurality of communication networks, wherein the media gateway device includes a Synchronous Transport Module (STM) interface for connecting to a PSTN among the plurality of communication networks, a media protocol conversion interface for connecting to an IP network among the plurality of communication networks, and a test command issuing unit including one or more processors, the media path setting method comprising
by the test command issuing unit, performing:
registering first setting data comprising a plurality of data entries, each respective data entry associating a respective media path ID in the STM interface with a respective termination ID in the STM interface;
registering second setting data comprising a plurality of data entries, each respective data entry associating a media path ID in the media protocol conversion interface with a respective termination ID in the media protocol conversion interface; and
for each respective combination in a plurality of combinations combining one respective data entry selected from the first setting data and one respective data entry selected from the second setting data, generating a respective mapping between the STM interface and the media protocol conversion interface by associating a first termination ID of the STM interface specified in the data entry selected from the first setting data with a second termination ID of the media protocol conversion interface specified in the data entry selected from the second setting data, and performing a respective test call for a respective media path corresponding to the respective mapping, wherein performing the respective test call comprises:

issuing a test command to establish a session for the respective media path;

assigning a resource to the session established for the respective media path by setting the first termination ID of the STM interface and the second termination ID of the media protocol conversion interface as one context in a Megaco signal;

transmitting a bit pattern to the media protocol conversion interface using the respective media path and the assigned resource;

receiving the bit pattern from the media protocol conversion interface using the respective media path;

in response to successfully transmitting the bit pattern to the media protocol conversion interface and receiving the bit pattern from the media protocol conversion interface, determining that the respective media path has passed a continuity test; and storing a continuity test status of the respective media path in association with a respective media path ID.

* * * * *